Feb. 2, 1954    L. DOMENACH ET AL    2,668,186
ELECTRIC CABLES WITH OIL PRESSURE OUTSIDE THE INSULATION
Filed May 28, 1948

INVENTORS
LOUIS DOMENACH,
LOUIS MACARDIER,
by
ATTORNEYS

Patented Feb. 2, 1954

2,668,186

UNITED STATES PATENT OFFICE 2,668,186

ELECTRIC CABLE WITH OIL PRESSURE OUTSIDE THE INSULATION

Louis Domenach and Louis Macardier, Lyon, France, assignors to Compagnie Generale d'Electricite, Paris, France, a corporation of France Application May 28, 1948, Serial No. 29,684

3 Claims. (Cl. 174—12)

The present invention relates to cables having paper insulation impregnated with oil under pressure, wherein the pressure is maintained by means of a pressure fluid, liquid or gaseous, circulating in a canal exterior to the insulation and separated therefrom by an impervious membrane.

In such cables, in the case in which there exists substantial differences of level along the length of its course, this type of cable presents disadvantages which are the more serious according as the density of the impregnating material departs the more from that of the pressure fluid. If the density of the pressure fluid is less along the length of the course of the cable, the impregnating material travels toward the lower parts, and the higher parts thus deprived of their impregnating material attain a smaller safety coefficient. Further, in the lower parts, there is danger that the membrane will burst under the application of the static pressure. If the density of the pressure fluid is greater than that of the impregnating material, the membrane will be compressed in the lower parts, and will be compressed in the lower parts, and will become distended in the higher parts.

These defects will be particularly accentuated when the impregnating material is fluid oil; since the employment of fluid oil is more particularly of interest in cables of high voltage where the thickness of the insulation is great and where the employment of thin papers renders the insulation very compact.

The present invention has for an object to remedy these mentioned disadvantages in cables impregnated with fluid oil.

Another object of the present invention is to use cables with fluid oil under pressure with thin pieces of paper, thus avoiding the aforementioned difficulties. The subject of the present invention is a cable impregnated with fluid oil capable of use along the lengths of cable having large differences of level and for long distances without the circulation of interior oil along the length of the cable and without intermediate checking or stopping joints, this cable being characterised in that the wound insulation is subjected to an external compression by oil having the same density as the impregnation oil, this being effected through the medium of a separating membrane of lead or of synthetic material impervious to oil, this membrane being provided inside of a steel tube or a sheath of reinforced lead.

Other characteristics of the invention and of its advantages will be apparent from the description which follows, and which refers to an embodiment given by way of example only, relating to a cable with a single conductor. It is however to be understood that the present invention can be applied with some modifications in details to cables with a plurality of conductors.

Figure 1:
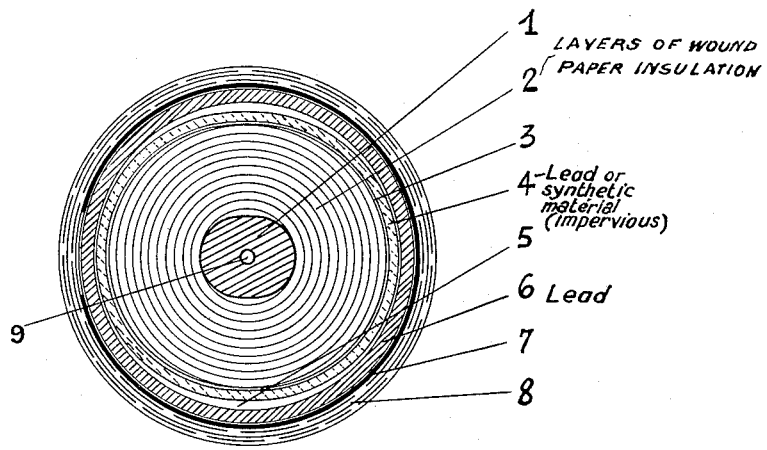
Fig. 1 shows in cross section a cable according to the present invention.

In the arrangement shown in Figure 1, the conductor of the cable is designated by 1. It is preferably made up of an assembly of wires, profiled or shaped in a known manner, at least on the exterior layer, so as to present a smooth surface. It may be of oval or elliptical form, and has only a very small central channel 9 for longitudinal circulation of oil during impregnation of the cable in the factory and during the mounting of the accessories.

The insulation 2 consists of wound paper impregnated with fluid oil. According to the present invention this paper is very thin and of thickness less than or equal to 0.04 mm. in the neighborhood of the conductor. For preference linen pulp paper is used in conformity with our patent above referred to.

The exterior surface of the insulation is covered by a conductive armor 3 adapted to be joined to the lead sheath at intervals, and by an oil-proof sheath membrane of lead or synthetic material 4, applied by extrusion by means of a sheathing press, and of such material as Neoprene, plasticized polyvinyl chloride, or polyethylene. If the sheath 4 is of synthetic material, it may with advantage be rendered conductive or semi-conductive by a suitable admixture; this allows of dispensing with the armor 3 and of making continuous contact with the exterior envelope of lead or the steel tube which will be referred to later. The conductive armor 3 can be connected to the lead sheath 6 by suitable kinds of metallic key or spacer pieces soldered at spaced intervals to this armor 3 before extrusion of the membrane 4. Otherwise, the membrane 4 can be rendered conducting by utilizing as the material for this membrane, a synthetic material containing a certain percentage of graphite or even of a metallic powder.

The incorporation of a conducting material such as graphite in a synthetic material may be carried out in known manner by the incorporation of the graphite in the mixture to be extruded at the moment of its preparation.

The cable thus constituted is provided with an envelope of lead 6 applied by a press, and leaving a space of a few millimetres between the cable and the envelope, forming a channel 5 designed to receive the pressure liquid or oil under pressure. As an alternative to the channel 5, several flutings or grooves may be internally formed in the lead envelope 6 in known manner by a lead press.

To withstand the highest working pressure, the envelope 6 is bound with a metallic reinforcement 7 composed of enveloping metal strips or wires spirally wound in short and long pitch. This reinforcement is protected by the usual protecting sheath 8 against chemical and electrolytic corrosion. For a cable with one conductor the reinforcement 7 will advantageously consist, as is known, of strips of non-magnetic stainless steel, which permits of dispensing with the protective sheath 8.

The cable, provided with its sheath 4, may be drawn into a steel tube instead of having a bound lead casing 6, without departing from the scope of the present invention. In this case, the pressure liquid or oil serving for the compression circulates between the steel tube and the sheath 4.

According to the present invention the compression pressure liquid or oil enclosed in the channel space 5 has as nearly as possible the same density as the fluid oil impregnating material of the paper. For example the same oil can be utilized for the pressure fluid but without having to treat it to improve electrical properties. It is also possible to use a liquid as fluid as possible and add thereto substances such as to impart to it the same density as the insulation oil with which the paper of the insulation 2 is impregnated.

It follows from this equality of density, that at all points the cable, whatever their altitude, the static pressures of the liquid in channel 5 and the oil in insulation 2 are equal to each other. Consequently even if the pressure applied to the liquid in channel 5 is less than that due to the difference in level encountered along the length of the cable, there is no danger that void spaces will be formed in the higher parts and that the sheath membrane will be subjected to internal excessive pressure capable of causing a burst.

In order to ensure the perfect filling with the impregnating oil of the insulation 2 whatever may be the temperature variations of the cable, there are utilized according to the invention pressure reservoirs for the pressure liquid in channel 5 along the length of the cable, in such a manner as to absorb the variations in the expansion of the impregnation oil of the insulation 2 consequent upon the variations of the load being carried by the cable.

Figure 2:
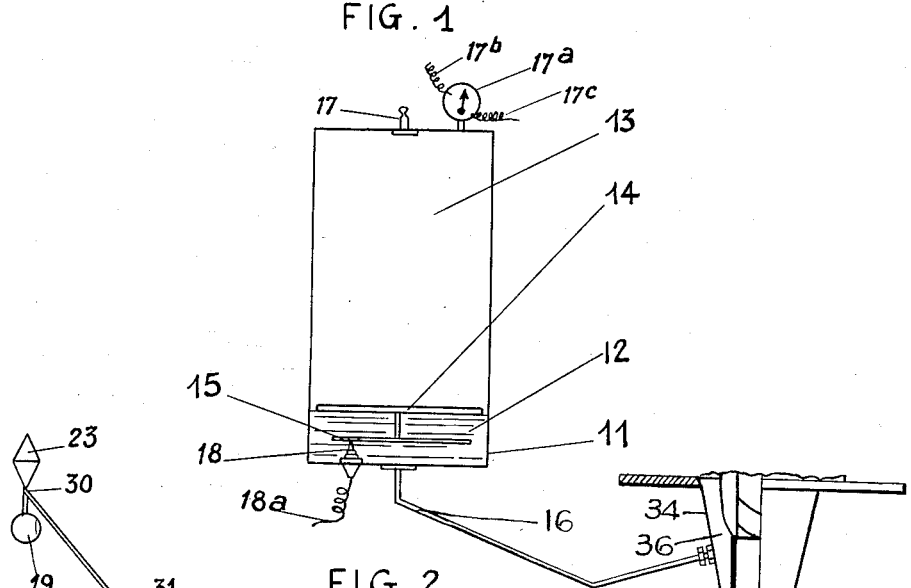
Fig. 2 shows the intermediate temperature compensating oil reservoirs.

These reservoirs may be simply constructed as shown in Figure 2. A casing 11 resistant to pressure contains a liquid 12 upon which a gas 13 exercises a given pressure, adjusted to the desired value at the time of installation. Between the gas and the oil, a float, such as a freely displaceable disc 14, carries rods such as 15 which may be adapted to close the switch contacts 18 of relay circuits 18a for indicating the escape of oil. The escape of gas may be indicated by suitable conventional means such as a rod like 15, or by a manometer switch 17a closing switch contacts of a signaling circuit 17b, 17c. A nozzle 16 is provided for making connection from the reservoir to the channel 5. The tubular nozzle connection 16 is preferably connected as by soldering to the end boxes or to each junction box, through which the path is completed to channel 5. Such an end box is shown at 34 in Fig. 2, wherein the cable is shown at 35, and the oil channel 36 between the outer wall of the end box and the cable 35 and its insulation, connects with the oil channel 5 of the cable as shown in Fig. 1. Such an end box with connection to an oil reservoir, is shown in the Macardier Patent 2,606,950, and in the Eby Patent 1,888,075. Oil from reservoir 11 may flow through pipe 16 into the oil channel 36 of the end box, and into the oil channel 5 of the cable. The pipe 16 may connect with the interior oil channel of an intermediate junction box, instead of an end box.

These reservoirs 11 play the same part as the oil reservoirs of ordinary cables with fluid oil, but the pressure liquid in the channel 5, being outside the electric field, need not have any particular electric characteristics. The channel 5 and the pressure liquid contained therein are outside of the electric field of conductor 1 because of the intervening conductive armor 3, and the sheath 4 which may be lead or a conductively treated synthetic material. There is therefore no necessity to provide in the reservoirs chambers which are proof against gas and oil, and it is possible at small expense to have control of a large quantity of pressure oil for a small variation of pressure in the gas about the value of the pressure fixed for the operation of the cable. These reservoirs 11 are distributed along the length of the cable at such distances that the loss of pressure in the channel 5 remains within reasonable limits.

Figure 3:
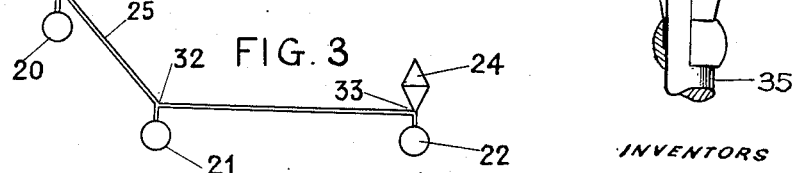
Fig. 3 shows a length of cable having a portion in a sloping position, and pressure compensating reservoirs of the type shown in Fig. 2, connected at the terminal and intermediate points of the cable.

The gas pressure in each such reservoir will be controlled as a function of the altitude of the particular reservoir but in such a manner as to have regard to the minimum working pressure fixed of the insulation 2. Finally the reservoirs may be connected to the channel 5 at any point along its continuous run by welded tubes, without it being necessary in order to provide special supply points to insert the junctions or stopping or check joints, as is necessary in ordinary fluid oil cables. A gas valve is shown at 17. Such an arrangement is shown in Fig. 3. A length of cable is shown at 25, having a horizontal portion between the points 32 and 33, and a relatively steep sloping portion between the points 30 and 32. As an example, the difference in elevation of points 30 and 32 may be 100 meters. End boxes at the respective ends of the length of the cable are shown at 23 and 24. At 19, 20, 21 and 22, are shown compensating reservoirs similar to the reservoir 11 shown in Fig. 2, connected to the cable respectively at points 30, 31, 32, 33. The point 31, to which reservoir 20 is connected, is midway between point 30 and point 32. For example, if the cable shown in Fig. 3 has a minimum necessary operating impregnating oil pressure of 2 kg./cm.$^2$, the four reservoirs 19, 20, 21, 22, would be respectively adjusted, commencing with 19 in the highest position to pressure values of 2 kg./cm.$^2$; 7 kg./cm.$^2$; 12 kg./cm.$^2$; 12 kg./cm.$^2$, allowing a pressure difference of 10 kg./cm.$^2$ for the difference in elevation of 100 meters of points 30 and 32.

One of the advantages of the present invention is also that of being able to employ reservoirs at small expense and of quite small size and easily controllable for cables at elevated pressures. Another advantage resides in the elimination of stopping or checking joints in so far as the differences of altitude along the length of the cable do not exceed the limit of structural strength which may obtain in the exterior envelope.

A further advantage of the present invention is that of diminishing the diameter of the conductors of high tension fluid oil cables for a given section of conductor by reducing the central channel. Thus the capacity reactance of the cable is diminished and in consequence likewise the reactive power to compensate for the transmission of energy to a great distance.

It will be apparent to those skilled in the art that our invention is susceptible of modifications to adapt the same to particular applications, and all such modifications which are within the scope of the appended claims, we consider to be comprehended within the spirit of our invention.

We claim:

1. In an oil filled electric cable of high voltage, subject to considerable variations of elevation, having wound paper insulation wound around the cable conductor and impregnated with a fluid impregnating oil, an internal conducting membrane around said insulation and being impervious to said impregnating oil so impregnating said cable insulation, an external electrically conducting pressure resisting envelope arranged surrounding and spaced from said membrane and forming an integral part of said cable, a metallic reinforcing sheath mounted surrounding and in contact with said membrane, the channel space between said envelope and said membrane containing a pressure liquid of substantially the same density as said fluid impregnating oil, and compensating means for compensating for the variations of the pressure of said fluid impregnating oil, said means acting on said pressure liquid along the whole length of the cable, and said means comprising individual external one-chamber reservoirs distributed along the length of said cable and containing said pressure liquid and being in communication with the space between said envelope and said membrane at spaced points along the length of the cable, each said one-chamber reservoir comprising a casing and a float displaceably mounted in said casing and a liquid outlet connection from said casing on a first side of said float and being connected to said channel space between said envelope and said membrane, a pressure gas contained in the portion of said casing on the second side of said float, and said pressure fluid being contained in the portion of said casing on said first side of said float connected to said channel space, the pressure of said pressure gas contained in each said reservoir being adjusted according to the altitude of the respective reservoir in such manner as to assure by compensation the complete impregnation with impregnating oil of said wound paper insulation.

2. A cable according to claim 1, and being adapted for very high voltage, said wound paper insulation consisting of bands of thin paper of a thickness not exceeding 0.04 millimeter in the immediate vicinity of the conductor.

3. A cable according to claim 1, said compensating means comprising welded tubes respectively connecting said reservoirs with the space between said envelope and said membrane at spaced points along the length of said cable.

LOUIS DOMENACH.
LOUIS MACARDIER.

References Cited in the file of this patent

UNITED STATES PATENTS

| Number | Name | Date |
|---|---|---|
| 1,933,347 | Shanklin | Oct. 31, 1933 |
| 1,972,625 | Hunter | Sept. 4, 1934 |
| 1,991,368 | Bennett | Feb. 19, 1935 |
| 2,047,000 | Calvert | July 7, 1936 |
| 2,054,046 | Vogel | Sept. 8, 1936 |
| 2,067,169 | Beaver et al. | Jan. 12, 1937 |
| 2,433,729 | Bennett | Dec. 30, 1947 |
| 2,532,152 | Domenach et al. | Nov. 28, 1950 |

FOREIGN PATENTS

| Number | Country | Date |
|---|---|---|
| 435,860 | Great Britain | Oct. 1, 1935 |
| 444,856 | Great Britain | Mar. 30, 1936 |
| 486,970 | Great Britain | June 14, 1938 |
| 711,817 | France | July 8, 1931 |